(12) United States Patent
Flaherty et al.

(10) Patent No.: US 10,783,798 B2
(45) Date of Patent: Sep. 22, 2020

(54) COACHING SYSTEM FOR GUIDING INTERACTIONS

(71) Applicant: INTERNATIONAL BUSINESS MACHINES CORPORATION, Armonk, NY (US)

(72) Inventors: Vicki L. Flaherty, Coralville, IA (US); Joseph N. Kozhaya, Morrisville, NC (US); Jennifer K. Paylor, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 14/995,579

(22) Filed: Jan. 14, 2016

(65) Prior Publication Data

US 2017/0206793 A1     Jul. 20, 2017

(51) Int. Cl.
*G09B 5/00* (2006.01)

(52) U.S. Cl.
CPC ..................... *G09B 5/00* (2013.01)

(58) Field of Classification Search
USPC ........................................... 434/247
See application file for complete search history.

(56) References Cited

U.S. PATENT DOCUMENTS

| | | |
|---|---|---|
| 2013/0317886 A1 | 11/2013 | Kiran et al. |
| 2014/0074589 A1 | 3/2014 | Nielsen et al. |
| 2015/0189085 A1 | 7/2015 | Riahi et al. |
| 2015/0254675 A1 | 9/2015 | Kannan et al. |

*Primary Examiner* — Kesha Frisby
(74) *Attorney, Agent, or Firm* — Cantor Colburn LLP; Tihon Poltavets

(57) ABSTRACT

Embodiments include method, systems and computer program products for coaching an individual during an interaction with a client to produce a desired outcome. Aspects include receiving a user profile for the client, one or more needs of the client, and a goal of the interaction and receiving a modeling profile for the client and relevant environmental information for the client. Aspects also include monitoring the interaction between the individual and the client and analyzing a feedback of the client to actions of the individual and providing guidance to the individual to assist the individual in producing the desired outcome, wherein the guidance is based on the feedback.

20 Claims, 7 Drawing Sheets

COACHING SYSTEM FOR GUIDING INTERACTIONS

BACKGROUND

The present disclosure relates to managing interactions between individuals and more specifically, to methods, systems and computer program products for coaching an individual during their interactions with clients to produce desired outcomes.

Existing methods for managing interactions between individuals involve processes and methodologies that tend to be complicated and not people centric. For example, the Enterprise Process Innovation Continuum (EPIC) methodology teaches a technical process for engaging with clients. EPIC is an analytics-driven methodology for process innovation and continuous improvement, which includes putting processes through a continuous cycle of measurement, analysis and improvement, and working toward best-practice process designs. While EPIC and other existing techniques are helpful in describing how to deliver solutions, they are lacking in teaching individuals to listen to clients' needs and accordingly suggest solutions. Furthermore, these techniques do not include any cognitive capabilities to understand user's personality traits, needs, values, and feedback, and then use that information to guide the engagement.

SUMMARY

In accordance with an embodiment, a method for coaching an individual during an interaction with a client to produce a desired outcome is provided. The method includes receiving a user profile for the client, one or more needs of the client, and a goal of the interaction and receiving a modeling profile for the client and relevant environmental information for the client. The method also includes monitoring the interaction between the individual and the client and analyzing a feedback of the client to actions of the individual and providing guidance to the individual to assist the individual in producing the desired outcome, wherein the guidance is based on the feedback.

In accordance with another embodiment, a processing system configured to coach an individual during an interaction with a client to produce a desired outcome is provided. The processing system includes a processor in communication with one or more types of memory. The processor is configured to receive a user profile for the client, one or more needs of the client, and a goal of the interaction and to receive a modeling profile for the client and relevant environmental information for the client. The processor is further configured to monitor the interaction between the individual and the client and analyze a feedback of the client to actions of the individual and provide guidance to the individual to assist the individual in producing the desired outcome, wherein the guidance is based on the feedback.

In accordance with a further embodiment, a computer program product for coaching an individual during an interaction with a client to produce a desired outcome includes a non-transitory storage medium readable by a processing circuit and storing instructions for execution by the processing circuit for performing a method. The method includes receiving a user profile for the client, one or more needs of the client, and a goal of the interaction and receiving a modeling profile for the client and relevant environmental information for the client. The method also includes monitoring the interaction between the individual and the client and analyzing a feedback of the client to actions of the individual and providing guidance to the individual to assist the individual in producing the desired outcome, wherein the guidance is based on the feedback.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
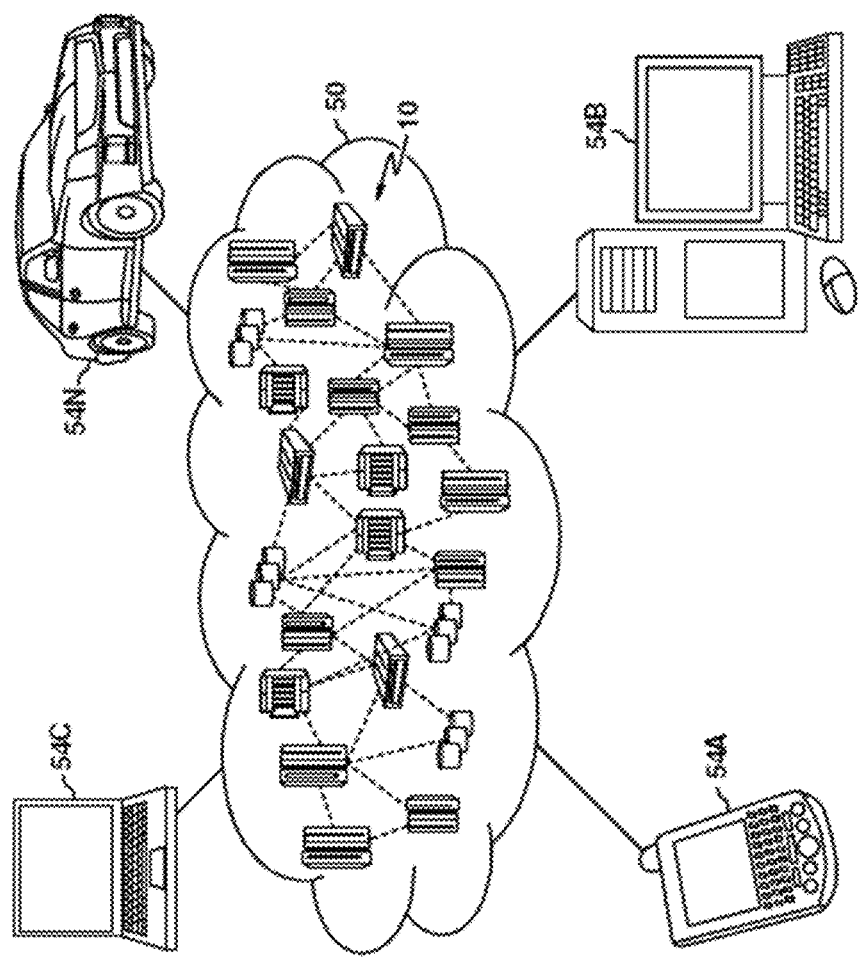
FIG. 1 depicts a cloud computing environment according to an embodiment of the present invention.

In accordance with exemplary embodiments of the disclosure, methods, systems and computer program products for coaching an individual during an interaction with a client to produce a desired outcome are provided. In exemplary embodiments, the interaction between the individual and the client are monitored by a coaching system that analyzes feedback of the client to the actions of the individual. Based on the feedback of the client and based on one or more of a user profile of the client, needs of the client, and a goal of the interaction, the coaching system provides guidance to the individual on how to proceed with the interaction. In exemplary embodiments, the coaching system is configured to receive a modeling profile for the client and obtain relevant environmental information regarding the client. The modeling profile for the client and the relevant environmental information can also be used by the coaching system to determine the guidance to provide to the individual.

The coaching system is based on a successfully applied coaching approach that involves four components: 1) seeing people as people, 2) awareness of self, others and surroundings, 3) listening for need and asking questions, and 4) taking small intentional steps. The coaching system involves responding to dynamic situations in an emotionally intelligent and passionate way that builds stronger relationships—and thereby leads to the meta-motivation of users who consistently go beyond themselves to deliver more value in their relationships with others that lead to long-standing partnerships. The disclosed coaching system allows users to reach and deliver on their full potential regularly.

In exemplary embodiments, the coaching system is configured to manage the interactions between individual and their clients by guiding the actions of the individual based on a set of principles. The set of principles includes encouraging individuals to: think of clients as people and not as a means to an end; be aware of their surrounding and those of their clients; focus on listening and asking questions; and on taking small intentional steps to deliver a desired outcome. In exemplary embodiments, the coaching system utilizes a variety of cognitive services and capabilities to help guide a successful engagement.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
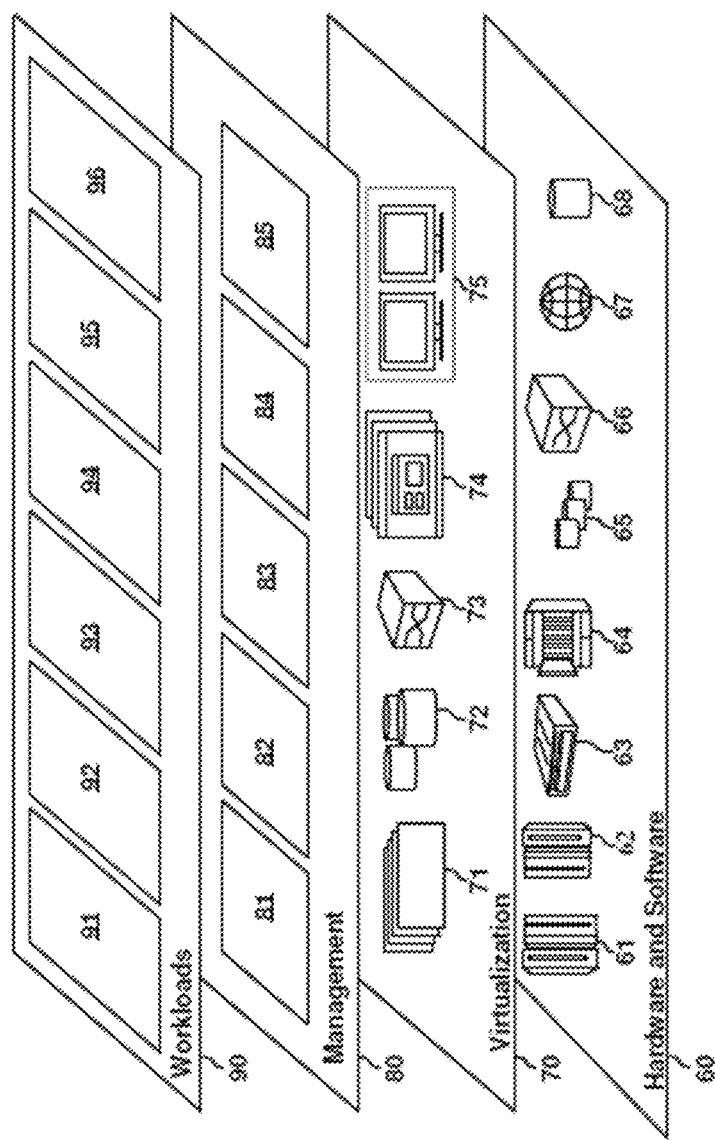
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and coaching systems 96.

Figure 3:
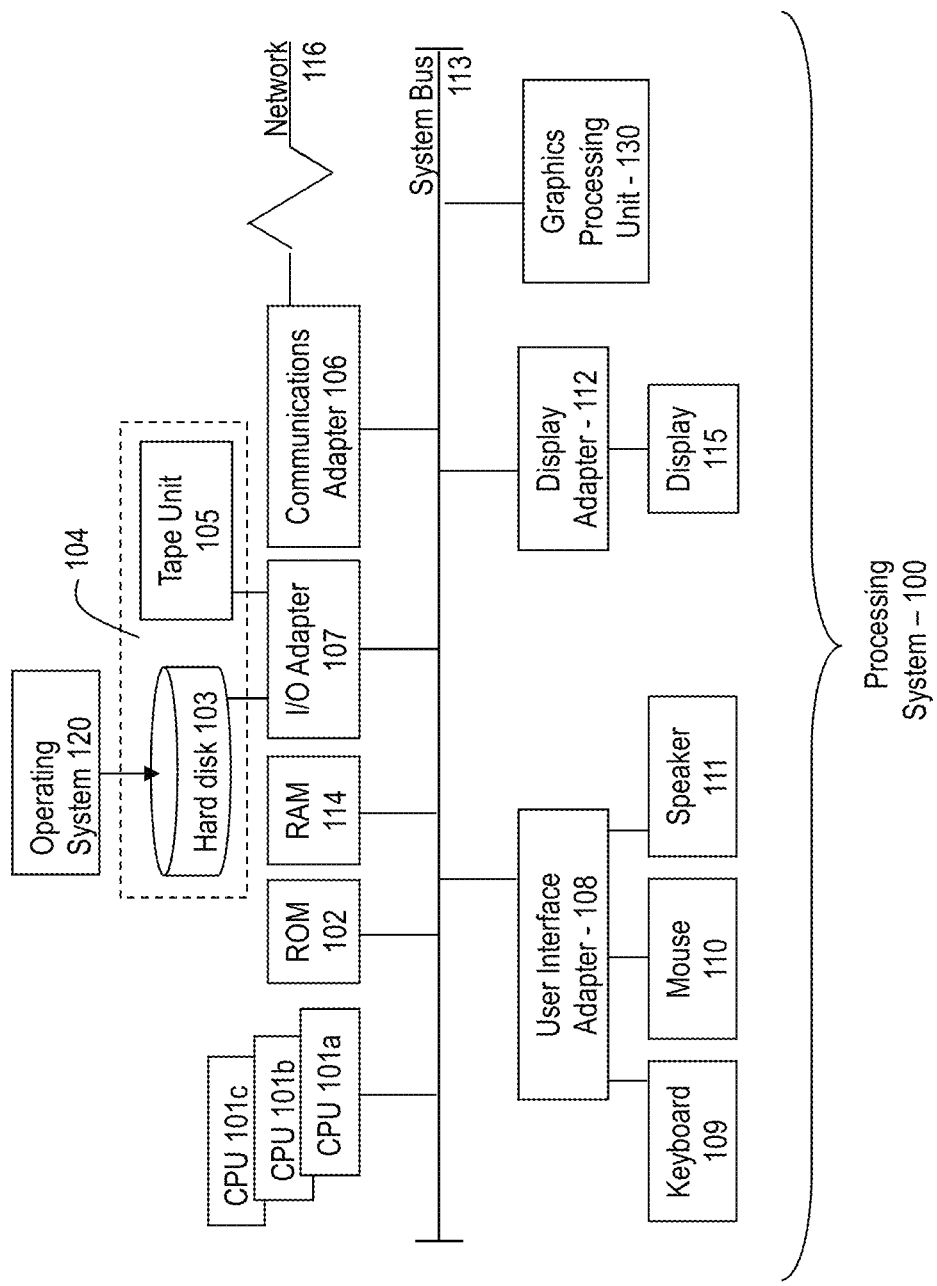
FIG. 3 is a block diagram illustrating one example of a processing system for practice of the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
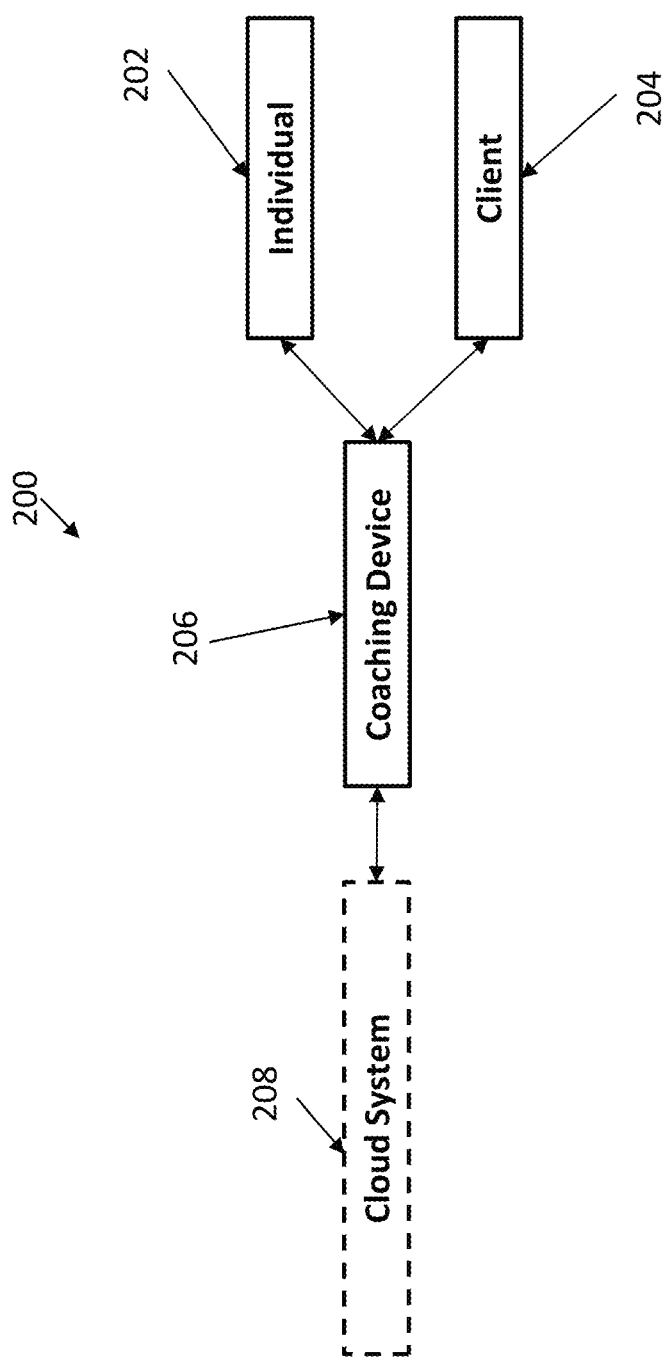
FIG. 4 is a block diagram illustrating a system for coaching an individual during an interaction with a client to produce a desired outcome in accordance with an exemplary embodiment.

Referring now to FIG. 4 a block diagram illustrating a coaching system 200 for coaching an individual 202 during an interaction with a client 204 to produce a desired outcome in accordance with an exemplary embodiment is shown. As illustrated, the system 200 includes a coaching device 206 which is configured to monitor an interaction between the individual 202 and the client 204. In exemplary embodiments, the coaching device 206 may be embodied in a processing system such as the one shown in FIG. 3, in a tablet, in a smartphone, or the like. In addition, the coaching device 206 may be configured to communicate with a cloud system 208 that is configured to store, access, and/or process information about the individual 202, the client 204 and their interactions. In one embodiment, the coaching device 206 is configured to capture the interaction data and provide guidance to the individual 202 while the cloud system 208 is configured to perform the processing of the interaction data and to generate the guidance that is provided.

In one embodiment, the coaching system 200 includes a coaching device 206 that is a tablet that has a microphone and a camera that are configured to monitor an interaction between the individual 202 and the client 204 by capturing both the audio of their conversation and physical action(s) via a video of their interactions. In other embodiments, the coaching device 206 may be embodied in a smartphone or teleconference system that is configured to monitor only an audio of an interaction of an individual 202 and the client 204.

The coaching device 206 is configured to obtain a user profile for a client, one or more needs of a client, a goal of the interaction, a modeling profile for the client, and relevant environmental information for the client 204 and the individual 202. In exemplary embodiments, this information can be gathered from a variety of sources including, but not limited to, the individual, a cloud system 208, and the coaching device 206. For example, this information may be retrieved from a social network that the client and/or individual are members of, from a customer relationship management database, from the Internet, or from various other sources. The information can be provided to the cloud system 208 and/or the coaching device 206 for processing.

The coaching device 206 analyses the interaction data, captured by a camera and/or microphone of the coaching device, to determine a feedback of the client 204 to the actions of the individual 202. The interaction data can include, but is not limited to, the tone of the client's voice, the body language of the client and the word choices of the client. For example, the coaching device 206 may use a known natural language processing algorithm to analyze the conversation between the individual 202 and the client 206. Based on the feedback and on the gathered information, the coaching device 206 may be configured to provide the individual 202 with guidance as how to proceed with the interaction to achieve the desired outcome. For example, if the feedback of the client 204 is not positive, indicating that the client is not receptive to the interaction between the client 204 and the individual 202, the coaching device 206 may prompt the individual 202 to modify their sales approach or to change topics entirely. In exemplary embodiments, the coaching device 206 may be configured to utilize the cloud system 208 to analyze the monitored interaction data to determine a feedback of the client 204 to the actions of the individual 202.

It is often difficult for sales people to simultaneously concentrate on providing information about the products and services that they are discussing and to monitor how that information is being received by their client. Accordingly, the coaching device 206 is configured to be used as a complementary tool for engaging with clients that can be relied upon to monitor the feedback being provided by the client. In addition, the coaching device 206 is capable of interpreting the actions, body language, word choice, and tone of voice of the client with greater speed and accuracy than most humans can.

Figure 5:
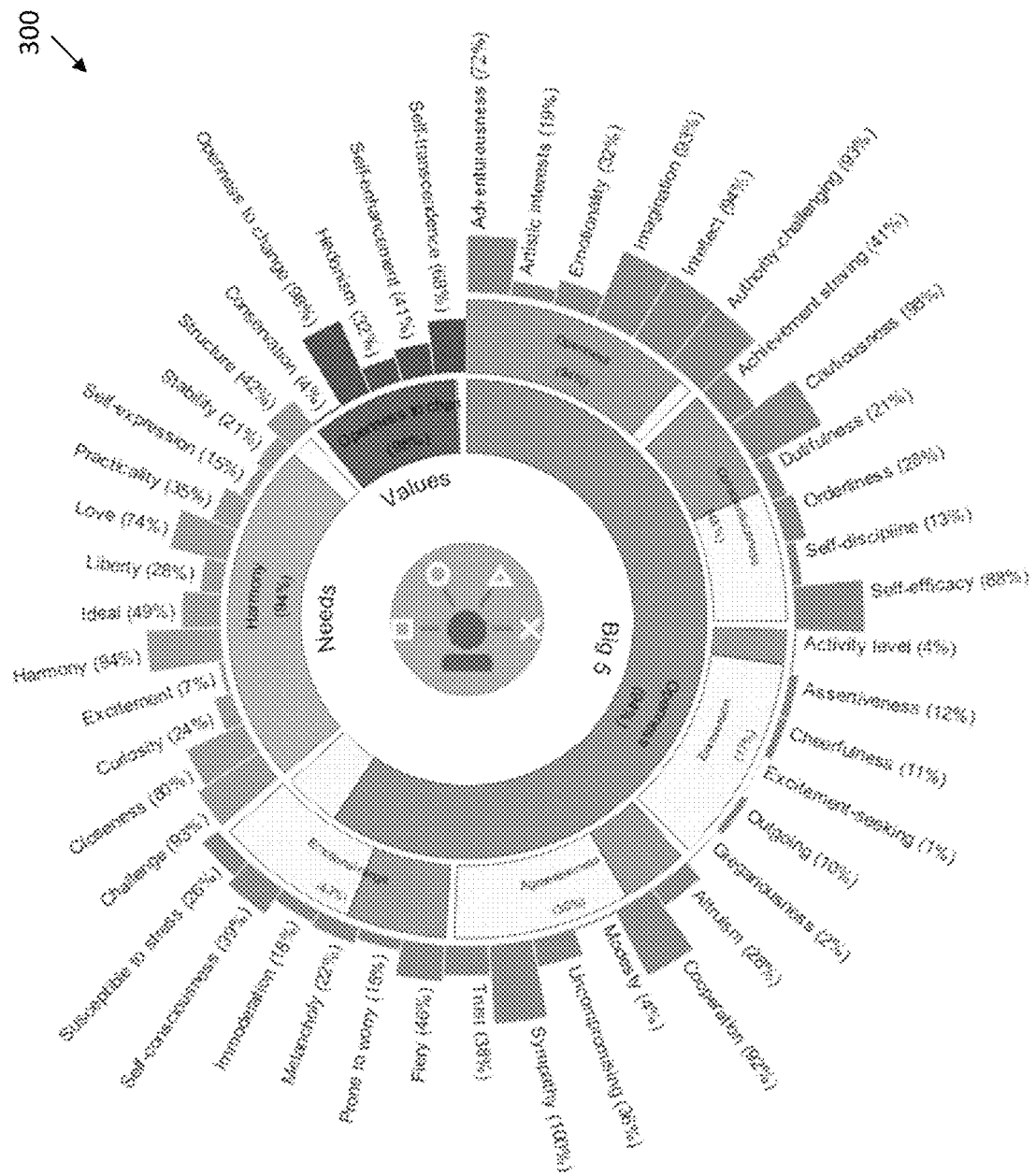
FIG. 5 is a block diagram illustrating a modeling profile in accordance with an exemplary embodiment.

Referring now to FIG. 5 a block diagram illustrating a modeling profile 300 in accordance with an exemplary embodiment is shown. In exemplary embodiments, the cloud system shown in FIG. 4, is configured to generate the modeling profile 300 based off of the collected data for the client. The collected data may include information about the client from social networks, customer relationship management database, data input from the individual and/or the client, or the like. In exemplary embodiments, the modeling profile 300 is created using an analytic service such as the Watson Personality Insights™ of IBM. The analytic service is configured to use linguistic analytics to infer the personality characteristics, intrinsic needs and values of individuals from communications that a user opts to make available via mediums such as email, text messages, social media, forum/blog posts, and more. The modeling profile 300 can be used to help businesses better understand their clients and improve customer satisfaction by anticipating customer needs and recommending future actions. This allows businesses to improve new client acquisition, retention, and engagement, and strengthen their relationships with existing customers.

In exemplary embodiments, the modeling profile 300 may include various kinds of personality insights, such as personality characteristics, needs and values. For example, the analytic service can build a portrait of an individual's personality characteristics and how they engage with the world across five primary dimensions: Openness, Conscientiousness, Extroversion, Agreeableness, and Neuroticism (also known as Emotional Range). In addition, the analytic service can infer certain aspects of a product that will resonate with an individual across twelve needs: Excitement, Harmony, Curiosity, Ideal, Closeness, Self-expression, Liberty, Love, Practicality, Stability, Challenge, and Structure. Furthermore, the analytic service can identify values that describe motivating factors which influence a person's decision-making across five dimensions: Self-transcendence/Helping others, Conservation/Tradition, Hedonism/Taking pleasure in life, Self-enhancement/Achieving success, and Open to change/Excitement.

Figure 6:
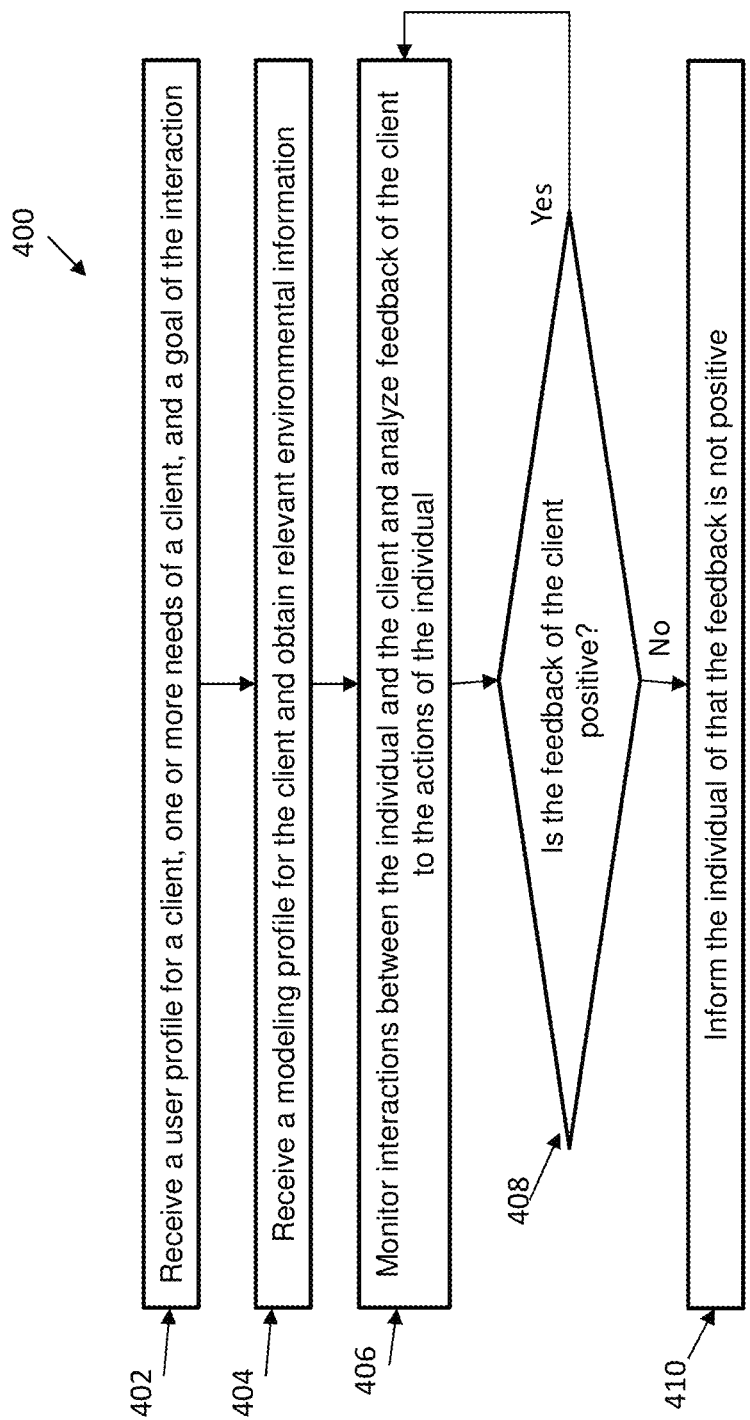
FIG. 6 is a flow diagram of a method for coaching an individual during an interaction with a client to produce a desired outcome in accordance with an exemplary embodiment.

Referring now to FIG. 6 a flow diagram of a method 400 for coaching an individual during an interaction with a client to produce a desired outcome in accordance with an exemplary embodiment is shown. As shown at block 402, the method 400 includes receiving a user profile for a client, one or more needs of a client, and a goal of the interaction. In exemplary embodiments, a coaching device may prompt the individual for information about the client, such as the name of the client(s), a relationship between the individual and the client of the other person. The individual may input a name, position, location, profile, a client company name, a history of engagement between the client's company and the individual's company, as well as social media information about the client. In exemplary embodiments, the coaching device may be configured to look up a user profile for the client from a profile database if one exists. Likewise, the coaching device can query various databases to obtain any available information about the client and his company. The information provided by the individual, or obtained by the queries, regarding the client can be used to populate an internal customer relationship management database for future interactions. As shown at block 402, the method 400 also includes receiving the needs of the client and the goal of the interaction. In exemplary embodiments, the individual enters the goals for the interaction into the coaching system. By requiring the individual to enter the goals for the interaction into the coaching system, it helps focus the individual on the desired outcome of the interaction.

Next, as shown at block 404, the method 400 includes receiving a modeling profile for the client and obtaining relevant environmental information. In exemplary embodiments, receiving a modeling profile for the client includes checking to see if a modeling profile exists for the client. If a modeling profile does not exist for the client, receiving a modeling profile for the client includes using an analytic service to generate a modeling profile for the client. The analytic service is provided with the profile information available about the client and generates a modeling profile that identifies the client's needs and personality traits. In exemplary embodiments, the modeling profile may be similar to the one shown in FIG. 4.

The coaching system can use the information provided by the modeling profile to guide the interaction between the individual and the client. For example, as shown in FIG. 4, the modeling profile for the client identifies a high percentage for openness to change, accordingly the coaching system may suggests to the individual that the client is a good candidate for offering new products that are fundamentally different (as opposed to just upgrades of previous generation products). Likewise, the modeling profile for the client indicates a high degree of cautiousness, accordingly the coaching device may suggest that the individual provide strong evidence of the capabilities of the new IT products such as comparative studies with other products and details numbers on performance and efficiency versus other existing products in the market.

Continuing with reference to block 404, in exemplary embodiments, relevant environmental information may be obtained by prompting a user to enter the environmental information or it may be obtained by using existing methods for summarizing news and other content to identify relevant information about the environment of the interaction. Information about the environment of the interaction can include, but is not limited to, environmental conditions affecting the client that should be considered by the individual. For example, if the client works in New York City and there was recently a hurricane that hit New York City, then coaching system may provide these environmental conditions to the individual suggesting to start the discussion with client by checking that he and his family and loved ones were not affected by the hurricane. The coaching system can obtain this information by collecting news in the location where client's office is located.

In exemplary embodiments, the coaching system is configured to leverage the identified needs by listening to the discussion between the individual and the client and providing guidance to the individual to ask relevant questions. In addition, the coaching system examines the needs of a client, as returned by personality insights, and compares those against a lookup table to suggest questions for the individual to ask to better understand how to provide solutions for the client.

Next, as shown at block 406, the method 400 includes monitoring the interactions between the individual and the client and analyzing feedback of the client to the actions of the individual. For example, the coaching system is configured to capture the behavior of the client and determine their feedback. There are several existing techniques that monitor a person's voice, tone, language, as well as body language to deduce that person's emotional state. As shown at decision block 408, the method 400 includes determining if the feedback of the client is positive. The coaching system leverages this information to provide guidance to help the individual with being self-aware. For example, the coaching system can alert the individual if they are coming across as helpful, understanding, and supportive or not. As shown at block 410, the method also includes informing the individual that the feedback is not positive. For example, the coaching system can provide guidance to the individual that suggests that they change topics if the feedback that the client is providing is not positive.

In exemplary embodiments, the guidance provided by the coaching system may be overt, i.e., it can be seen or heard by both the individual and the client, or it may be covert, i.e., it can only be seen or heard by the individual. The guidance can take many forms depending on how the coaching system is configured. In one embodiment, the coaching system is embodied on a tablet and the screen of the tablet is used to provide guidance to the individual. For example, the coaching system may display one or more one or more statements for the individual to communicate to the client based on the one or more needs of the client, the goal of the interaction and the modeling profile. In another example, an icon on the tablet screen may change in size, shape or color based on the feedback of the client. The changing of the icon may be configured to be subtle such that only the individual is aware of the guidance provided. In another example, the coaching system may be configured to communicate with a wearable device disposed on the individual, such as a smartwatch or an earpiece. The coaching system may be configured to provide guidance to the individual via the wearable device. For example, the coaching system may instruct the smartwatch to vibrate once for a positive feedback indicator and twice for negative feedback indicator.

In exemplary embodiments, the coaching system is configured to focus on small steps in the interaction to maximize the benefit/return from the interaction between the individual and the client. The individual can then use the feedback to guide their actions and discussion. For example, if the client is providing positive feedback the individual can precede with discussion and if the client is providing negative feedback the individual can alter their approach, move to discuss another need or ask questions about a different topic. In exemplary embodiments, coaching system monitors the client's emotions to suggest actions for the individual. The coaching system can detect when a client has a high degree of interest in a subject being discussed and can then suggests to individual to continue along the path of the current discussion. If, on the other hand, the coaching system detects boredom or lack of interest from the client, the coaching system suggests to that the individual to explore a different offering.

In exemplary embodiments, the coaching system is configured to repeat the method 400 for every interaction. Personality needs, environmental conditions are all dynamic and thus, there is a need to approach every new interaction as if it is a first time interaction while leveraging the history of previous interactions for providing context and background.

Figure 7:
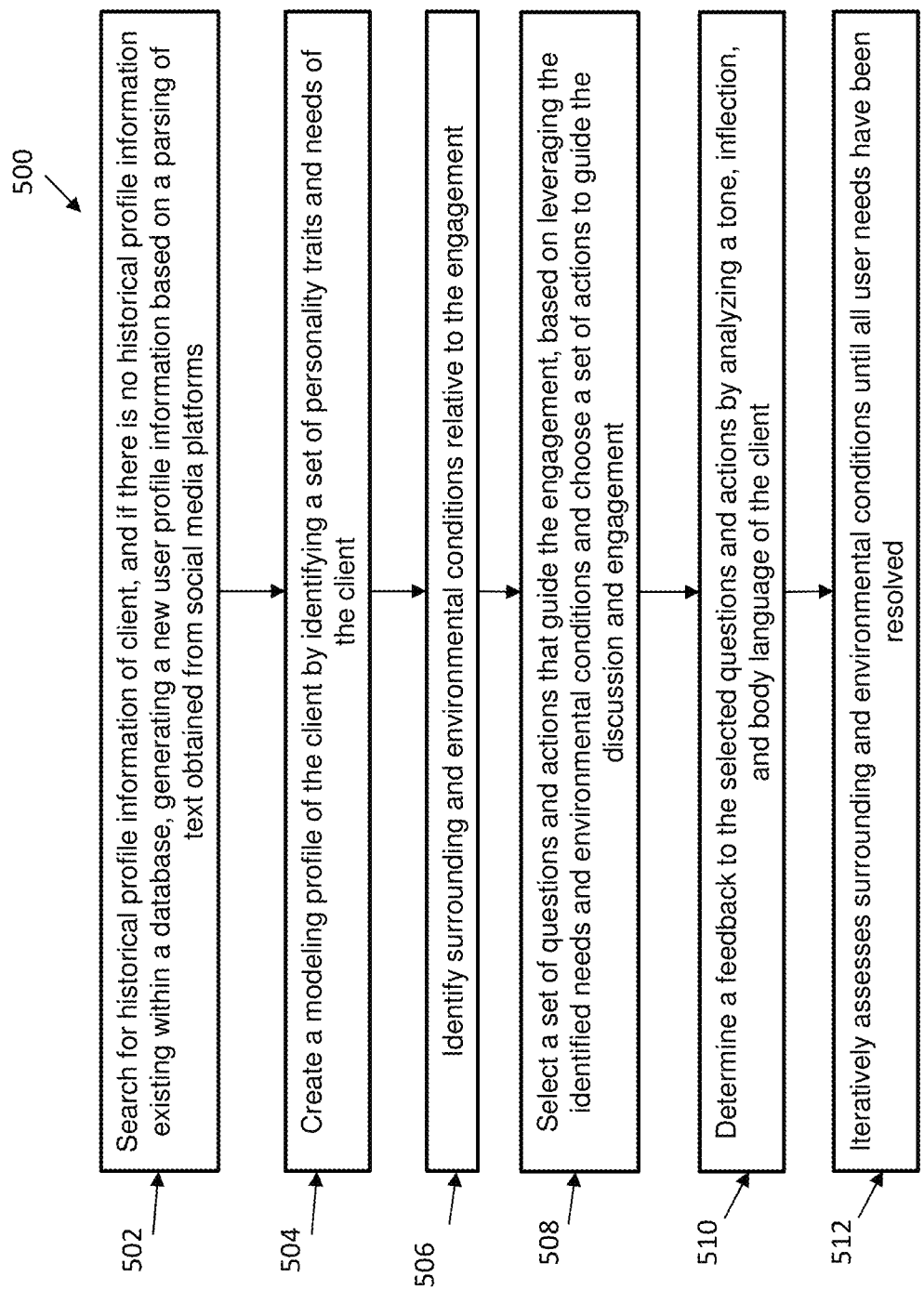
FIG. 7 is a flow diagram of another method for coaching an individual during an interaction with a client to produce a desired outcome in accordance with an exemplary embodiment.

Referring now to FIG. 7 a flow diagram of a method 500 for coaching an individual during an interaction with a client to produce a desired outcome in accordance with an exemplary embodiment is shown. As shown at block 502, the method 500 includes searching for historical profile information for the client, and if there is no historical profile information existing within a database, generating new user profile information based on a parsing of text obtained from social media platforms. Next, as shown at block 504, the method 500 includes creating a modeling profile for the client by identifying a set of personality traits and needs of the client based on user profile information. The method 500 also includes identifying surrounding and environmental conditions relative to the engagement, as shown at block 506. Next, as shown at block 508, the method 500 includes selecting a set of questions and actions that guide the engagement, where the process of selecting is based on leveraging the identified needs and environmental conditions and choosing a set of actions to guide the discussion and engagement. In exemplary embodiments, the selected questions and actions can be displayed to an individual on a dashboard. Next, as shown at block 510, the method 500 includes determining the feedback of the client to the selected questions and actions, analyzing a tone, inflection, and body language of the client. The method 500 also includes iteratively assessing dynamic surrounding and environmental conditions until all user needs have been resolved, as shown at block 512.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for coaching an individual during an interaction with a client to produce a desired outcome, the computer implemented method comprises:

receiving, by a processor, a user profile for the client, one or more needs of the client, and a goal of the interaction;

receiving a modeling profile for the client;

receiving relevant environmental information for the client, wherein the relevant environmental information is obtained, by the processor, from external news feeds;

monitoring, by a microphone, an interaction between the individual and the client;

analyzing a feedback of the client to actions of the individual, wherein analyzing the feedback of the client comprises analyzing a conversation, using natural language processing, between the individual and the client to identify a tone of speech of the client; and providing guidance to the individual to assist the individual in producing a desired outcome, wherein the guidance is based on the feedback and the tone of speech of the client.

2. The computer implemented method of claim 1, wherein the guidance comprises one or more statements to communicate to the client based on the one or more needs of the client, the goal of the interaction and the modeling profile.

3. The computer implemented method of claim 2, wherein the modeling profile includes one or more personality characteristics of the client, one or more intrinsic needs of the client and one or more values of the client.

4. The computer implemented method of claim 3, wherein the modeling profile of the client is created based on one or more of text authored by the client obtain from one or more social networks, a questionnaire completed by the client, and a speech from the client.

5. The computer implemented method of claim 2, wherein the one or more questions to ask the client are further based on the relevant environmental information for the client.

6. The computer implemented method of claim 1, further comprising instructing the individual to change a topic of discussion based upon a determination that the feedback is negative.

7. The computer implemented method of claim 1, further comprising instructing the individual to continue with a topic of discussion based upon a determination that the feedback is positive.

8. A computer program product for coaching an individual during an interaction with a client to produce a desired outcome, the computer program product comprising:

a non-transitory storage medium readable by a processing circuit and storing instructions for execution by the processing circuit for performing a method comprising:

receiving a user profile for the client, one or more needs of the client, and a goal of the interaction;

receiving a modeling profile for the client;

receiving relevant environmental information for the client, wherein the relevant environmental information is obtained, by the processor, from external news feeds;

monitoring, by a microphone, an interaction between the individual and the client;

analyzing a feedback of the client to actions of the individual, wherein analyzing the feedback of the client comprises analyzing a conversation, using natural language processing, between the individual and the client to identify a tone of speech of the client; and providing guidance to the individual to assist the individual in producing a desired outcome, wherein the guidance is based on the feedback and the tone of speech of the client.

9. The computer program product of claim 8, wherein the guidance comprises one or more statements to communicate to the client based on the one or more needs of the client, the goal of the interaction and the modeling profile.

10. The computer program product of claim 9, wherein the modeling profile includes one or more personality characteristics of the client, one or more intrinsic needs of the client and one or more values of the client.

11. The computer program product of claim 10, wherein the modeling profile of the client is created based on one or more of text authored by the client obtain from one or more social networks, a questionnaire completed by the client, and a speech from the client.

12. The computer program product of claim 9, wherein the one or more questions to ask the client are further based on the relevant environmental information for the client.

13. The computer program product of claim 8, further comprising instructing the individual to change a topic of discussion based upon a determination that the feedback is negative.

14. The computer program product of claim 8, further comprising instructing the individual to continue with a topic of discussion based upon a determination that the feedback is positive.

15. A processing system configured to coach an individual during an interaction with a client to produce a desired outcome comprising a processor in communication with one or more types of memory, the processor configured to:

receive a user profile for the client, one or more needs of the client, and a goal of the interaction;

receive a modeling profile for the client;

receive relevant environmental information for the client, wherein the relevant environmental information is obtained, by the processor, from external news feeds;

monitor, by a microphone, an interaction between the individual and the client;

analyze a feedback of the client to actions of the individual, wherein analyzing the feedback of the client comprises analyzing a conversation, using natural language processing, between the individual and the client to identify a tone of speech of the client; and provide guidance to the individual to assist the individual in producing a desired outcome, wherein the guidance is based on the feedback and the tone of speech of the client.

16. The processing system of claim 15, wherein the guidance comprises one or more statements to communicate to the client based on the one or more needs of the client, the goal of the interaction and the modeling profile.

17. The processing system of claim 16, wherein the modeling profile includes one or more personality characteristics of the client, one or more intrinsic needs of the client and one or more values of the client.

18. The processing system of claim 17, wherein the modeling profile of the client is created based one or more of text authored by the client obtain from one or more social networks, a questionnaire completed by the client, and a speech from the client.

19. The processing system of claim 16, wherein the one or more questions to ask the client are further based on the relevant environmental information for the client.

20. The processing system of claim 15, wherein the processor is further configured to instruct the individual to change a topic of discussion based upon a determination that the feedback is negative and to instruct the individual to continue with the topic of discussion based upon a determination that the feedback is positive.

* * * * *